United States Patent [19]

Ketschker et al.

[11] 4,443,045
[45] Apr. 17, 1984

[54] STABILIZED BEARING FOR BOGIES

[75] Inventors: Walter Ketschker; Reinhard Marquart; Alois Stenert, all of Lippstadt, Fed. Rep. of Germany

[73] Assignee: Hoesch Werke AG, Dortmund, Fed. Rep. of Germany

[21] Appl. No.: 331,668

[22] Filed: Dec. 17, 1981

[30] Foreign Application Priority Data

Dec. 17, 1980 [DE] Fed. Rep. of Germany ....... 3047464

[51] Int. Cl.³ .............. F16C 19/00; B61F 5/16; F16D 65/38
[52] U.S. Cl. .................. 308/223; 105/199 C; 188/71.7; 188/196 M
[58] Field of Search ............. 308/220, 221, 222, 224, 308/225, 226, 223; 188/83, 85, 727, 71.1, 136, 71.7, 196 V, 196 M; 384/422, 423; 105/199 R, 199 C, 199 CB

[56] References Cited

U.S. PATENT DOCUMENTS

| | | | |
|---|---|---|---|
| 2,888,102 | 5/1959 | Eksergian et al. | 188/196 V X |
| 3,024,873 | 3/1962 | Wilkinson | 188/196 M X |
| 3,237,724 | 3/1966 | Kershner et al. | 188/72.7 |
| 3,997,033 | 12/1976 | Bulmer | 188/72.7 |
| 4,102,440 | 7/1978 | Wood | 188/72.7 |
| 4,273,055 | 6/1981 | Borgeaud et al. | 105/199 R X |

*Primary Examiner*—Stuart S. Levy
*Assistant Examiner*—David Werner
*Attorney, Agent, or Firm*—Horst M. Kasper

[57] ABSTRACT

A swivel bearing is provided for a bogie which comprises a support mounted on a first race ring, a friction lining and a rolling element attached to the support for providing a braking position to the friction lining. A second race ring engages the first race ring through rolling elements. A counter friction lining support element is solidly mounted on the second race ring and supports a counter friction lining for engaging the friction lining. A cam element is attached to the second race ring suitably for engaging the roller to provide for a positioning of the friction lining versus the counter friction lining over a desired angle. The counter friction lining support element is preferably a clamp spring of suitable tension for limiting the total braking force on the bogie rotation.

12 Claims, 4 Drawing Figures

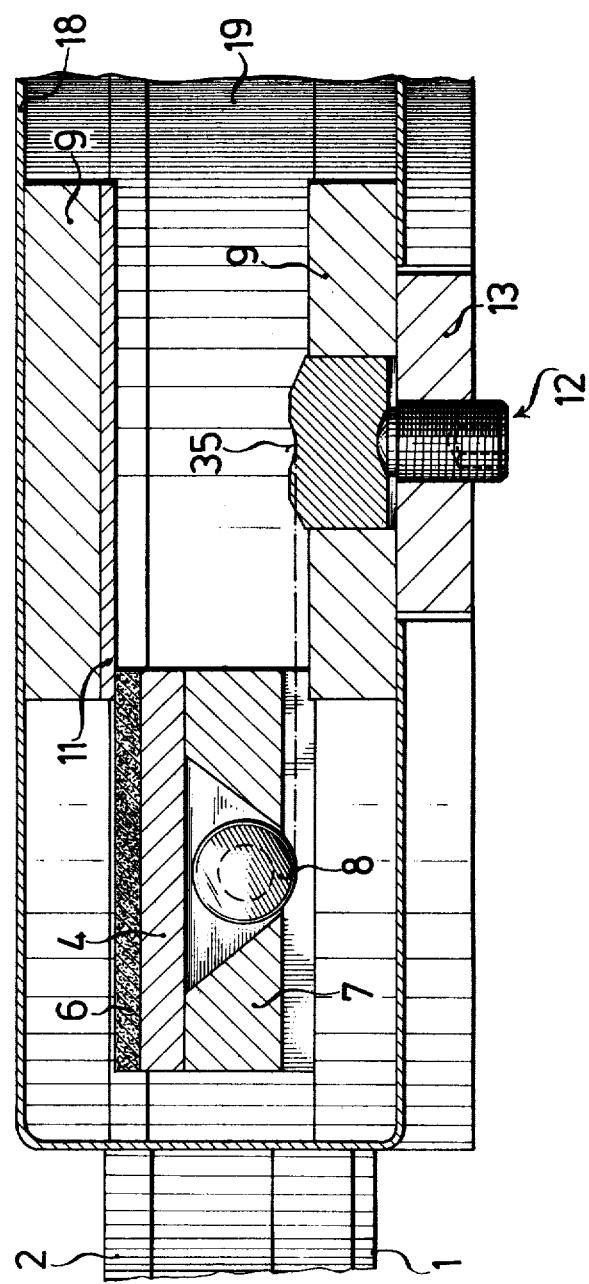

STABILIZED BEARING FOR BOGIES

DESCRIPTION

BACKGROUND OF THE INVENTION

1. Field of the Invention

The present invention relates to a closed or segmented bearing for bogies of rail vehicles with a swivel brake, preferably mechanically actuated and effective over a defined swivelling angle of the bogie.

2. Brief Description of the Background of the Invention Including Prior Art Bogies of rail vehicles are exited into vibrations caused by interfering influences coming from the rail path or from the vehicle and these vibrations cause a noisy vehicle run. This results in wear at the rails and at the wheels and can result in extreme cases in loss of the safety against derailment of rail vehicles. A tight running of the rotary motion of bogies cannot be a help in such a situation, since during corner runs the soft running of the bogies is required. Thus it becomes necessary to brake a rotary motion of the bogie during straight line motion of the vehicle and to assure during corner runs an easy rotatability of the bogie.

Such a rotary brake is provided in a roller bearing ring according to German Disclosure Document DE-AS No. 22 37 638 such that during the straight line run sliding elements are employed and thus increase the resistance against rotation. Furthermore, according to German Disclosure Documents DE-AS No. 15 25 067 and DE-PS No. 22 37 364 different bogie rolling bearings are known without rotary braking, that is without braking of the rotary motion, during straight line motion.

The roller bearing and the swivel brake are disposed in one construction area in a bogie bearing with mechanical rotary braking at straight line motion according to German Disclosure Document DE-AS No. 22 37 638. This does not allow to support the roller bearing in its service life by a grease or oil lubrication. In addition, abraded particles from the braking disc pass into the raceway of the roller bearing, such that the roller bearing is destructed in the course of time. In addition, this bogie bearing can only transfer resting loads of the vehicle box onto the bogie. The frequently occurring radial loads and also take-off loads cannot be transferred, such that for this purpose additional bearing units have to be provided. Regular bogie supports without rotary braking can transfer such forces.

SUMMARY OF THE INVENTION

1. Purposes of the Invention

It is an object of the present invention to provide a bearing for bogies of rail vehicles, which can transfer all loads from the vehicle box to the bogie.

It is a further object of the present invention to provide a bogie bearing where the bogie is braked in its rotation during straight line motion of the vehicle by way of a mechanical swivel brake and where the rolling bearing can be lubricated without problem and without abrading particles from the braking unit passing into the path of bearing.

It is another object of the present invention to provide a bogie bearing resulting in a decrease in rail and vehicle wear and in increased comfort of the ride of the vehicle.

These and other objects and advantages of the present invention will become evident from the description which follows.

2. Brief Description of the Invention

The present invention provides a swivel bearing for a bogie which comprises a support mounted on a first race ring, a friction lining and a position adjusting element attached to the support for providing a braking position to the friction lining, a second race ring engaging the first race ring through rolling elements, a counter friction lining support element solidly mounted on the second race ring and supporting the counter friction lining, which is to engage the friction lining, and a second position adjusting element attached to the second race ring suitable for engaging the first position adjusting element to provide for a positioning of the friction lining versus the counter friction lining over a desired angle of the relative position of the race rings.

The first position adjusting element can be a rolling element and the second position adjusting element can be a cam, which can comprise a control cam for engaging the rolling element and a cam bolt for adjusting the position of the control cam. A locking element can be provided for fixing the position of the cam bolt. The control cam and cam bolt can be adjustable and exchangeable and the rolling element can be a roller. At least one of the friction lining or counter friction lining can be freely movable in an axial direction relative to the supporting respective race ring. In a preferred embodiment at least two friction linings, two rolling elements, two counter friction linings and two cams can be provided. The cam can be provided with a hydraulic, pneumatic or electric position control system. The counter friction support element can be a spring element and preferably a clamp spring. A central recess can be provided in the control cam in order to provide a rest position for the rolling element during straight line motion of the vehicle.

There is also provided a method for selected braking of the swivel motion of a bogie with anti-friction bearing which comprises attaching to one race ring of the bearing a support carrying a first position adjusting element and a friction lining, mounting on the second race ring a support for a counter friction lining, disposing on the second race ring a second position adjusting element capable of engaging the first position adjusting element, and braking the relative motion of the race rings over a certain angular range of relative positions by engaging the friction lining and the counter friction lining.

The first position adjusting element and the second position adjusting element can be engaged by suitably setting the position of a cam versus the position of a rolling element and by providing for a proper relative angular position of the two race rings thus resulting in a braking of the relative motion of the race rings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which is shown one of the various possible embodiments of the present invention:

FIG. 4 is a sectional view similar to FIG. 3, however, in the position "corner motion of the vehicle".

DESCRIPTION OF INVENTION AND PREFERRED EMBODIMENTS

Figure 1:
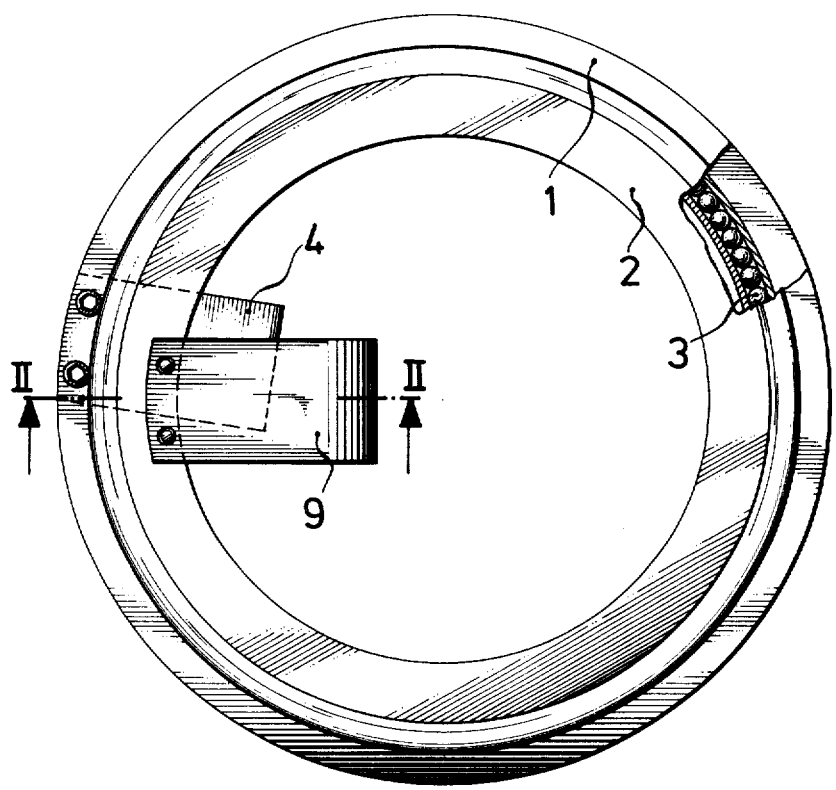
FIG. 1 is a plan view of a bogie bearing with a swivel brake according to the invention.

In accordance with the present invention there is provided a bogie bearing where one race ring is connected to a friction lining, which coacts with a counter friction lining connected to the other race ring and pressed by springs and where the springs are tensioned by a control cam in the area of the swivel angle. In order to adjust the rotary friction and the swivel angle of the swivel brakes and in order to be able to balance the wear of the friction lining, it is advantageous to provide the control arm adjustable and exchangeable. Based on the free axial movability of the swivel brake parts with respect to the race rings, the bearing does not have to transmit additional axial braking forces.

In addition, one or more swivel brakes can be disposed around the circumference of the bearing.

In case of a swivel motion not caused by the rotary motion of the bogie such as for example upon desired advance lifting of the braking power upon the entering of the vehicle into a corner turn, then the control cam can be substituted or actuated by hydraulic means, pneumatic means or electrical means and the thereby controlled friction bearing can be put in a pressing position.

The advantages provided by the present invention in particular comprise that the bearing element of a desired bearing construction form can be provided with a rotary brake during straight line motion of the vehicle, which brake is independent of the bearing. The service life and the functioning of the bearing are not affected by the rotary brake. In addition, the rotary brake operates by functioning independently from the bearing. This means that the brake is not influenced by the load of the vehicle box in its rotary braking power in contrast to the teaching of the German Disclosure Document DE-AS No. 22 37 638. Based on the directability and exchangeability of the control cam and the thereby resulting desired formability of the control cam profile, it is advantageously possible to get a swivelling property of the bogie adapted as desired to the vehicle. The disposition of the swivel brake according to the present invention allows not only a problem-free sealing of the bearing, but also of the brake units against environmental influences during the operation of the vehicle. In addition, advantageously, one or more of the braking units can be disposed at desired positions of the bearing. This results in advantages in the freedom relating to constructive restrictions of the of the total bogie bearing construction and in the desired strength of the of the rotary brake.

Furthermore, a particular advantage flows from the bogie bearing of the present invention resulting in a considerable decrease in the wear of the vehicle and of the rails. Also the vehicle comfort is advantageously increased and the loading of the environment is decreased by the lower emission of noise.

In the preferred embodiment a closed ball bearing is employed for the anti-friction bearing, which comprises an outer race ring 1, an inner race ring 2 and the balls 3 disposed in between. A friction lining support 4 is attached to the outer race ring 1 by way of bolts 5. The friction lining support 4 provides a connection between the race ring 1 and the friction lining 6. The friction lining support 4 carries the friction lining 6 external to the area of the bearing. Two pillow blocks 7 are disposed at the friction lining support opposite to the friction lining 6 and the pillow blocks 7 support a roll 8. A spring 9 is attached to the inner race ring 2, which is freely movable in an axial direction via guides 10. This spring surrounds the friction lining support 4 with its corresponding component parts. A counter friction lining 11 is disposed at the spring 9 as a counter face to the friction lining 6, such that the spring 9 does not wear.

The free end of the spring carries a cam support 13 carrying the control cam 12. The control cam 12 can be adjusted in its height by a thread in the cam support 13 and can be exchanged as such. In the embodiment shown, the cam comprises the cam head 14 and the cam bolt 15, which can be freely moved with respect to each other. The control cam can be adjusted in its height by turning the cam bolt in a cam support, and this setting allows to adjust the pretensioning of the spring according to the requirements. It is further possible, to provide a readjustment in case the friction lining wears down. Locking elements 16, 17 assure the position of the cam head. A cover 18 and a sealing band 19 prevent, that dirt and other contaminations interfere during the ride or the maintenance work with the functioning of the swivel brake.

Figure 2:
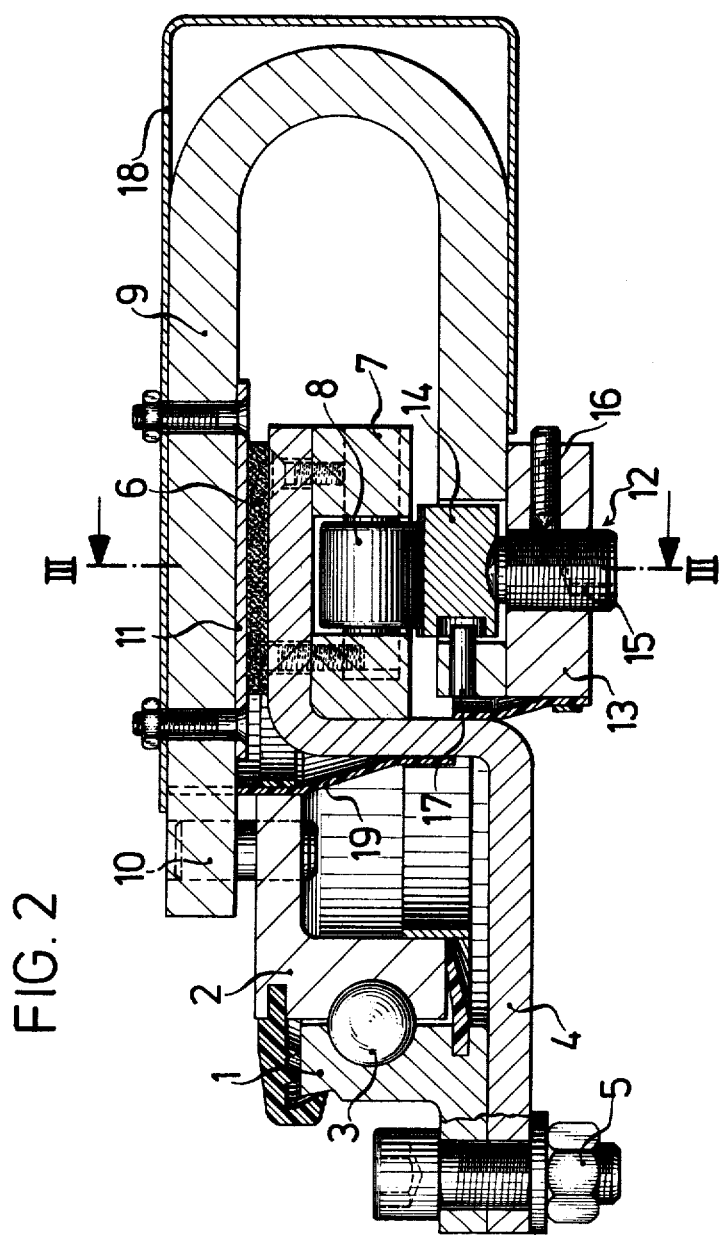
FIG. 2 is a sectional view of the bearing and the swivel brake along section line II—II of FIG. 1.
Figure 3:
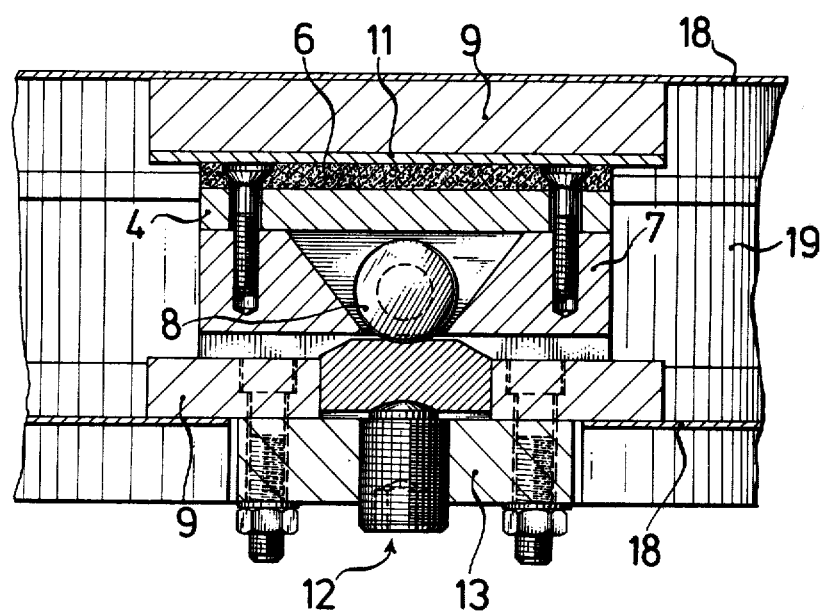
FIG. 3 is a sectional view of the swivel brake along section line III—III of FIG. 2 in the position "straight line motion of the vehicle"

The functioning of the swivel brake is shown in FIGS. 3 and 4 in connection with FIG. 2.

Upon a corner motion of the vehicle (FIG. 4) the spring 9 is relieved such that the friction lining 6 is not pressed against the counter friction lining 11. As soon as upon straight line motion of the vehicle the roll 8 engages the control cam head 14 (FIG. 3), the spring 9 is tensioned. Then the friction lining 6 is pressed against the counter friction lining 11 with the corresponding tensioning force of the spring 9, such that the desired swivel braking occurs. The placing in position of the bogie can also be supported by way of a central recess 35 in the cam head 14.

It will be understood that each of the elements described above, or two or more together, may also find a useful application in other types of bearing configurations and transportation procedures differing from the types described above.

While the invention has been illustrated and described as embodied in the context of a swivel brake for a bogie bearing, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention.

What is claimed as new and desired to be protected by Letters Patent is set forth in the appended claims:

1. A swivel bearing for a bogie comprising
   a first race ring;
   a spring support mounted on the first race ring;
   a friction lining attached to the spring;
   a first position adjusting element attached to the spring for providing a braking position to the friction lining;
   a second race ring engaging the first race ring through rolling elements;
   a counter friction lining for engaging the friction lining and wherein the friction lining is freely movable in an axial direction relative to the supporting race ring;
   a counter friction lining support element solidly mounted on the second race ring and supporting the counter friction lining and wherein the counter friction lining support element is a clamp spring;
   a second position adjusting element attached to the second race ring suitable for engaging the first position adjusting element to provide for a positioning of the friction lining versus the counter friction lining over a desired angle.

2. The swivel bearing for a bogie according to claim 1 wherein
   the first position adjusting element is a rolling element; and where the second position adjusting element is a cam.

3. The swivel bearing for a bogie according to claim 2 wherein the cam comprises
   a control cam for engaging the rolling element; and
   a cam bolt for adjusting the position of the control cam.

4. The swivel bearing for a bogie according to claim 3 further comprising a locking element for fixing the position of the cam bolt.

5. The swivel bearing for a bogie according to claim 3 wherein the rolling element is a roller.

6. The swivel bearing for a bogie according to claim 3 wherein the control cam and the cam bolt are adjustable and exchangeable.

7. The swivel bearing for a bogie according to claim 2 comprising at least two friction linings, two rolling elements, two counter friction linings and two cams.

8. The swivel bearing for a bogie according to claim 2 wherein the cam is provided with a hydraulic, pneumatic or electric position control system.

9. The swivel bearing for a bogie according to claim 2 wherein the counter friction lining support element is a spring element.

10. The swivel bearing for a bogie according to claim 3 further comprising
    a central recess in the control cam to provide a rest position for the rolling element.

11. A method for selected braking of the swivel motion of a bogie with a roller bearing comprising
    attaching to one race ring a support carrying a first position adjusting element and a friction lining;
    mounting on the second race ring a support element for a counter friction lining;
    disposing on the second race ring a second position adjusting element capable of engaging the first position adjusting element; and
    braking the relative motion of the race rings over a certain angular range of relative positions by engaging the friction lining and the counter friction lining.

12. The method for selected braking according to claim 11 wherein the first position adjusting element and the second position adjusting element are engaged by suitably setting the position of a cam versus the position of a rolling element and by providing for a proper relative angular position of the two race rings thus resulting in a braking of the relative motion of the race rings.

* * * * *